United States Patent
Ford et al.

(10) Patent No.: US 7,677,512 B1
(45) Date of Patent: Mar. 16, 2010

(54) MOUNTING BRACKET FOR ELECTRICAL OUTLET AND LOW VOLTAGE UNITS

(75) Inventors: Gregory H. Ford, Reno, NV (US); Anthony L. Gable, Reno, NV (US)

(73) Assignee: OEM Systems Company, Inc., Sparks, NV (US)

( * ) Notice: Subject to any disclaimer, the term of this patent is extended or adjusted under 35 U.S.C. 154(b) by 99 days.

(21) Appl. No.: 11/625,864

(22) Filed: Jan. 23, 2007

Related U.S. Application Data

(60) Provisional application No. 60/761,523, filed on Jan. 24, 2006.

(51) Int. Cl.
*A47B 96/06* (2006.01)
*A47F 5/00* (2006.01)
*A47F 5/08* (2006.01)
*A47H 1/10* (2006.01)
*E04G 3/00* (2006.01)

(52) U.S. Cl. ............... 248/205.1; 248/906; 248/300; 248/201; 248/200.1; 220/3.2; 220/3.3; 220/3.4; 220/3.5; 220/3.9

(58) Field of Classification Search ............... 248/906, 248/201, 200.1, 205.1, 300; 220/3.2, 3.3, 220/3.4, 3.5, 3.9
See application file for complete search history.

(56) References Cited

U.S. PATENT DOCUMENTS

| | | | |
|---|---|---|---|
| 4,483,453 A * | 11/1984 | Smolik | 220/3.5 |
| 4,561,615 A * | 12/1985 | Medlin, Jr. | 248/27.1 |
| 4,943,022 A * | 7/1990 | Rinderer | 248/205.1 |
| 4,953,733 A * | 9/1990 | Loscuito | 220/3.4 |
| 5,005,792 A * | 4/1991 | Rinderer | 248/205.1 |
| 5,354,953 A | 10/1994 | Nattel et al. | |
| 5,598,998 A | 2/1997 | Lynn | |
| 6,227,499 B1 | 5/2001 | Jennison et al. | |
| 6,940,017 B2 * | 9/2005 | Roesch et al. | 174/58 |
| 7,307,212 B1 * | 12/2007 | Gretz | 174/53 |

* cited by examiner

*Primary Examiner*—J. Allen Shriver, II
*Assistant Examiner*—Nkeisha J Smith
(74) *Attorney, Agent, or Firm*—Rick Martin; Patent Law Offices of Rick Martin, P.C.

(57) ABSTRACT

A rough-in bracket is provided consisting of a border with a central opening sized to fit one or more receptacles and one or more low voltage units. The bracket has a snap-off alignment bar to properly align the receptacle. Rearward protruding wiring flanges provides support for low voltage wires and cabling. Another embodiment has a removable via plastic nubs alignment tool snapped on and is snapped into the mounted receptacle to allow the border to be screwed into the stud. Then the alignment tool is removed. Screw in bases in the forward flange of the border provide a mount for a low voltage unit, whereby a single plastic cover can esthetically cover both the receptacle and the low voltage unit.

6 Claims, 6 Drawing Sheets

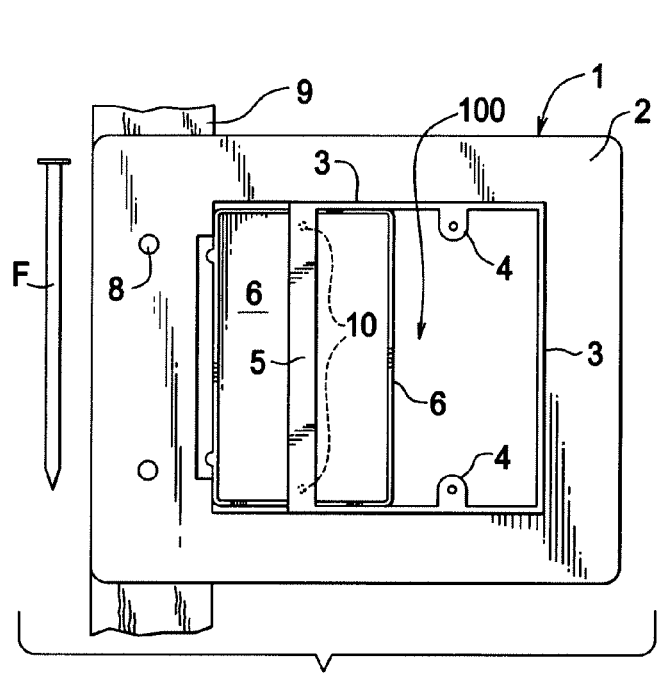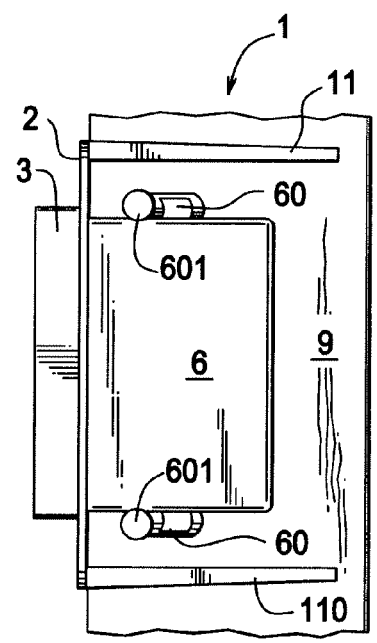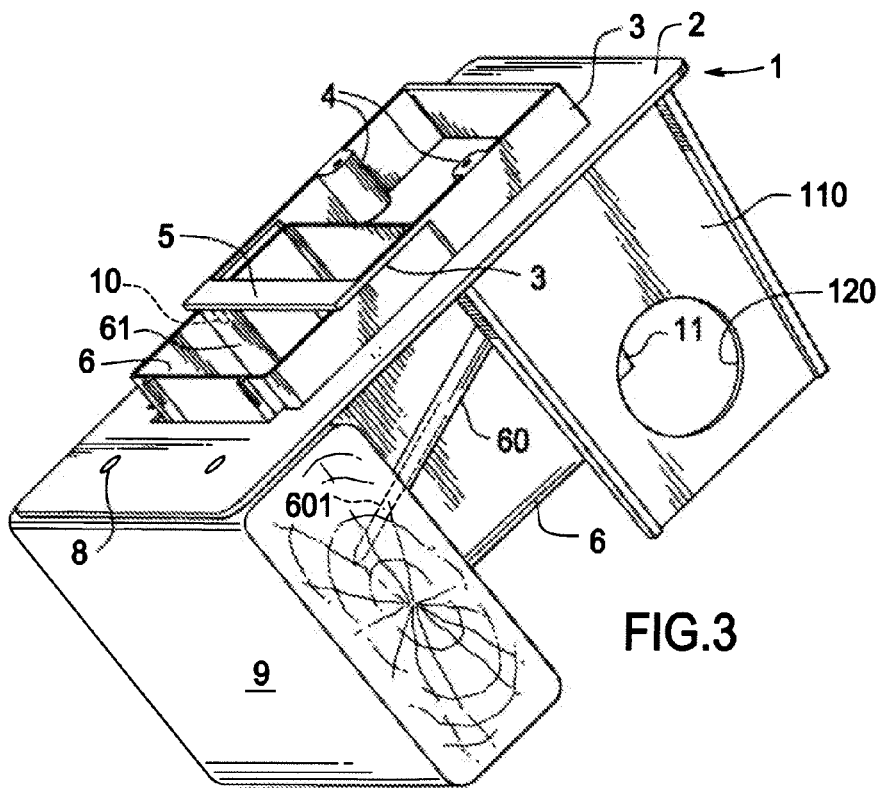

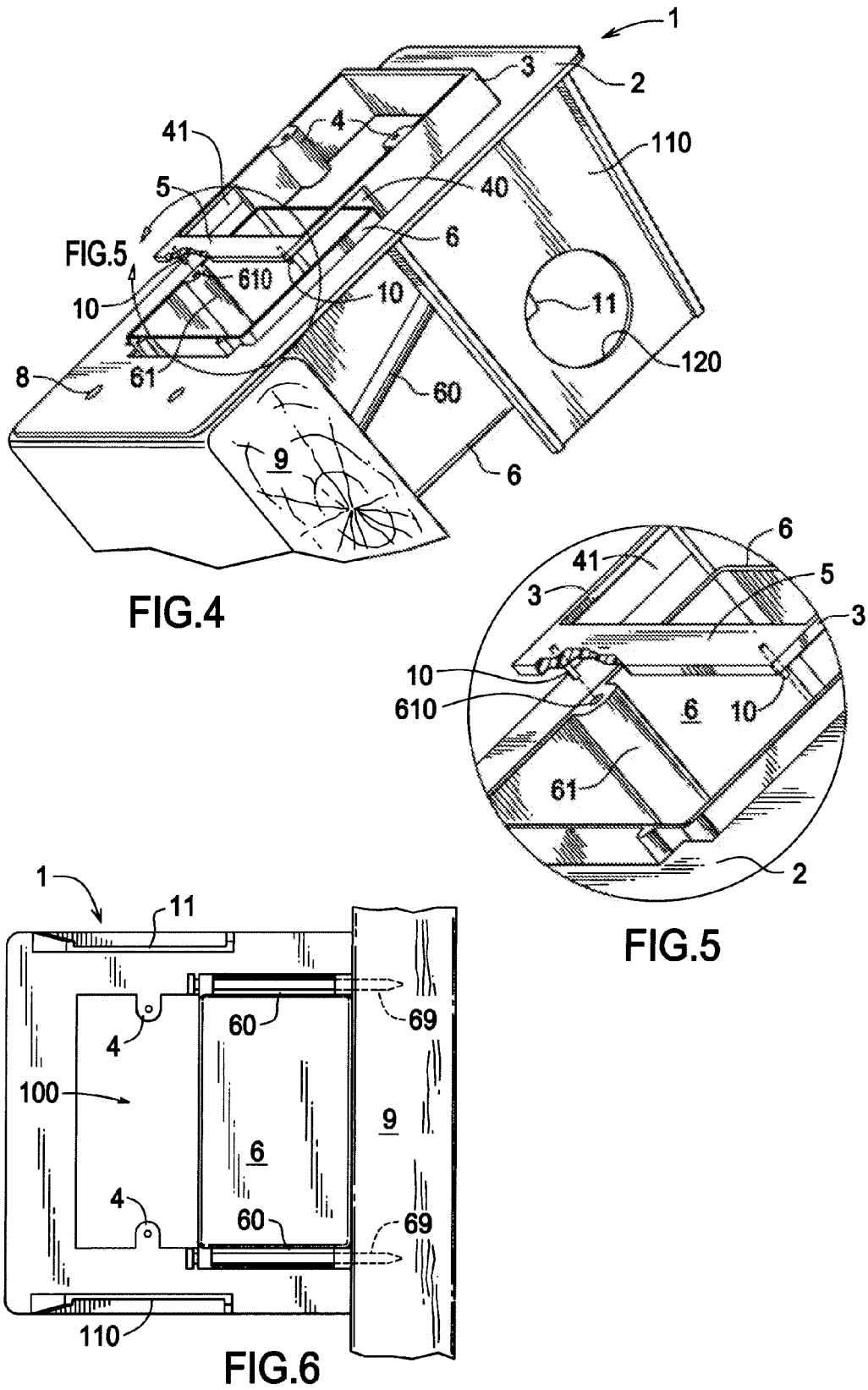

MOUNTING BRACKET FOR ELECTRICAL OUTLET AND LOW VOLTAGE UNITS

CROSS REFERENCE APPLICATIONS

This application is a non-provisional application claiming the benefits of provisional application No. 60/761,523 filed Jan. 24, 2006.

FIELD OF INVENTION

The present invention relates to providing a rough in bracket to surround an opening sized to accept a combination of standard electrical receptacles and a low voltage unit such as a CEBUS tap point, or a TV coax antenna cable and the like.

BACKGROUND

Homeowners prefer to keep the appearance of wall receptacle covers non-obtrusive. Thus, when a standard 110 volt electrical outlet is placed adjacent a group of stereo equipment signal wires and a cable TV outlet, the homeowner prefers to see one plastic wall cover mounted across this assembly of different electrical wires and receptacles.

U.S. Pat. No. 6,227,499 (2001) to Jennison et al. discloses a metal border sized to accept one or more standard electrical receptacles in combination with one or more low voltage CEBUS tap point units such as shown in U.S. Pat. No. 5,651,696, the disclosure of which is incorporated herein by reference. The '499 bracket is nailed to a vertical stud. Then an alignment tool, not shown in the patent, is needed to vertically and horizontally align the receptacle boxes before screwing the receptacle boxes to the metal border. When the wiring is complete a standard plastic cover is screwed to the bracket to create an aesthetically appealing wall cover for the assembly of different wire connections.

The problems associated with the '499 bracket include the need for an alignment tool as well as a lack of any mounting flanges for the various wires and conduits associated with the bracket. The patent does not refer to the alignment tool sold in the field in unison with the patented device. The present invention addresses these needs. No alignment tool is needed because a built in snap-off alignment bar is provided. Wiring flanges are provided.

SUMMARY OF THE INVENTION

An aspect of the present invention is to provide a disposable alignment bar to a rough in bracket.

Another aspect of the present invention is to provide a pair of horizontal flanges to the border in order to mount wires and conduits thereto.

These and other features and advantages of the Mounting Bracket for Electrical Outlet and Low Voltage Units reside in the construction of parts and the combination thereof, the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools and methods that are meant to exemplify and to illustrate, not being limiting in scope.

BRIEF DESCRIPTION OF THE DRAWINGS

FIG. 1 is a front plan view of a two bay mounting bracket.
FIG. 2 is a right side plan view of the FIG. 1 embodiment.
FIG. 3 is a top perspective view of the FIG. 1 embodiment, in a left hand version turned upside down.
FIG. 4 is a top perspective view of the FIG. 1 embodiment showing the alignment pins of the snap-off alignment bar.
FIG. 5 is a close up view of the alignment pins.
FIG. 6 is a rear plan view of the FIG. 1 embodiment.

Figure 7:
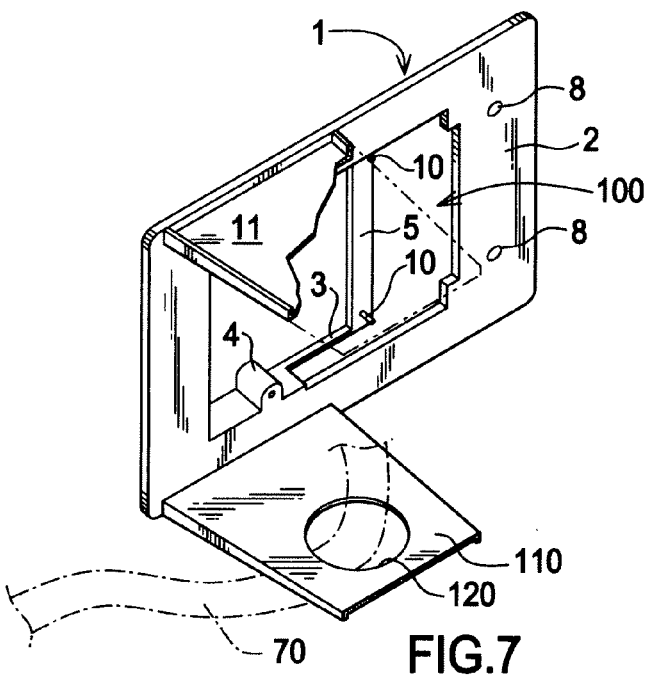
FIG. 7 is a rear perspective view of the FIG. 1 embodiment showing a wire in dots.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Referring first to FIGS. 1, 2, 3, 4, and 5, a mounting bracket 1 consists of a border 2 forming an opening 100. The opening 100 is sized to surround a receptacle 6 and a low voltage unit (not shown). Bases 4 can support the low voltage unit. The receptacle is supported in a known manner of driving a nail 601 through nail sleeve 60 into stud 9. This is usually done by an electrician at a given height on the stud 9. The border 2 has holes 8 for securing the mounting bracket 1 to the stud 9.

The border 2 has a forward flange 3 around which the wallboard (not shown) is framed. A standard plastic cover (not shown) then covers the entire assembly of members 1, 6 and a low voltage unit.

Since the opening 100 is larger than a standard receptacle 6, the alignment of receptacle 6 is necessary in both the 12 to 6 clock orientation and the 9 to 3 clock orientation after the nails 601 are hammered through nail sleeves 60. To provide this alignment without the need for any extra tools, a breakaway alignment bar 5 is provided, wherein the alignment bar 5 can be removed from the flange 3 after the pins 10 are placed in holes 610, and after a fastener(s) F secures the mounting bracket 1 to the stud 9. Thus, the mounting bracket is aligned with the receptacle 6.

The alignment bar 5 has alignment pins 10 which are set into the holes 610 of the bases 61 of the standard receptacle 6 for alignment. See FIGS. 4 and 5.

The border 2 also supports an upper wiring flange 11 with hole 12 and a lower wiring flange 110 with hole 120. These flanges 12, 120 project backward into the wall cavity in order to facilitate the wiring of the low voltage units, the wires possibly consisting of TV, stereo, alarm wires and the like.

The flange 3 has cutouts 40, 41 to accommodate the receptacle 6 as best seen in FIG. 4.

In FIG. 6 the receptacle 6 has been aligned and then nailed via nails 69 into the stud 9.

In FIG. 7 a cable 70 is threaded through hole 120 of flange 110 in preparation to connect a low voltage unit to it.

Figure 8:
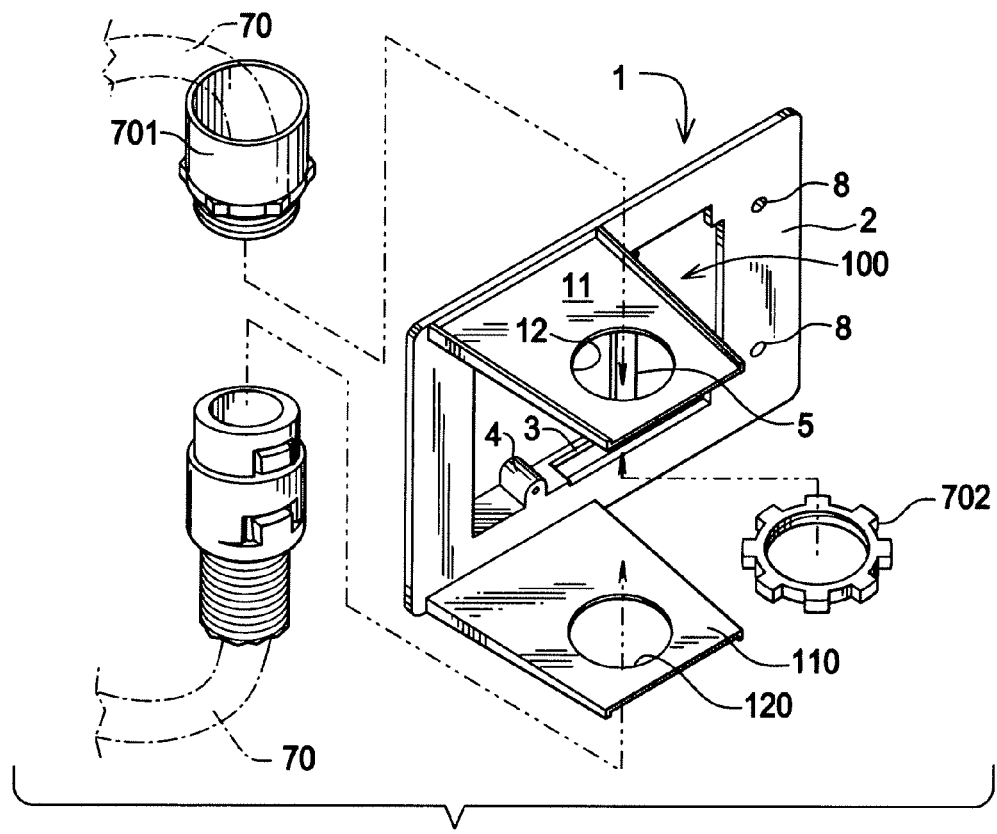
FIG. 8 is a rear perspective view of the FIG. 1 embodiment showing in exploded format conduits attached to the flanges.

In FIG. 8 the cable 70 has a known connector 700, which snaps, into hole 120. Another known connector 701 fits into hole 12 and is fastened by nut 702.

Figure 9:
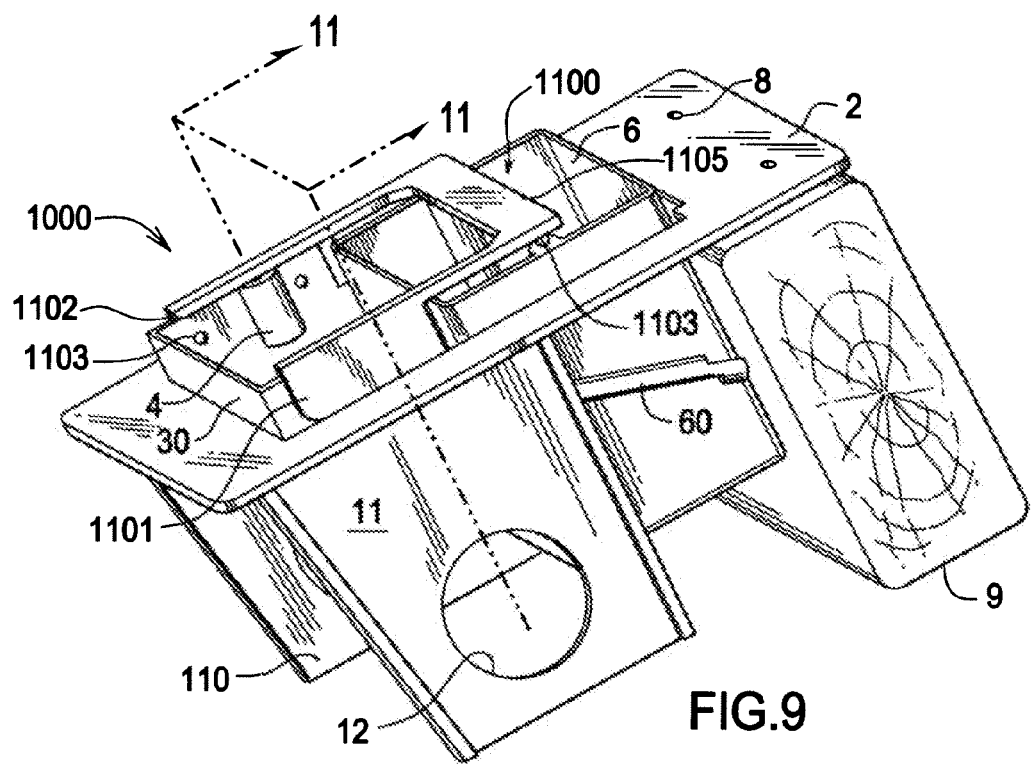
FIG. 9 is a top perspective view of an alternative embodiment mounting bracket.
Figure 10:
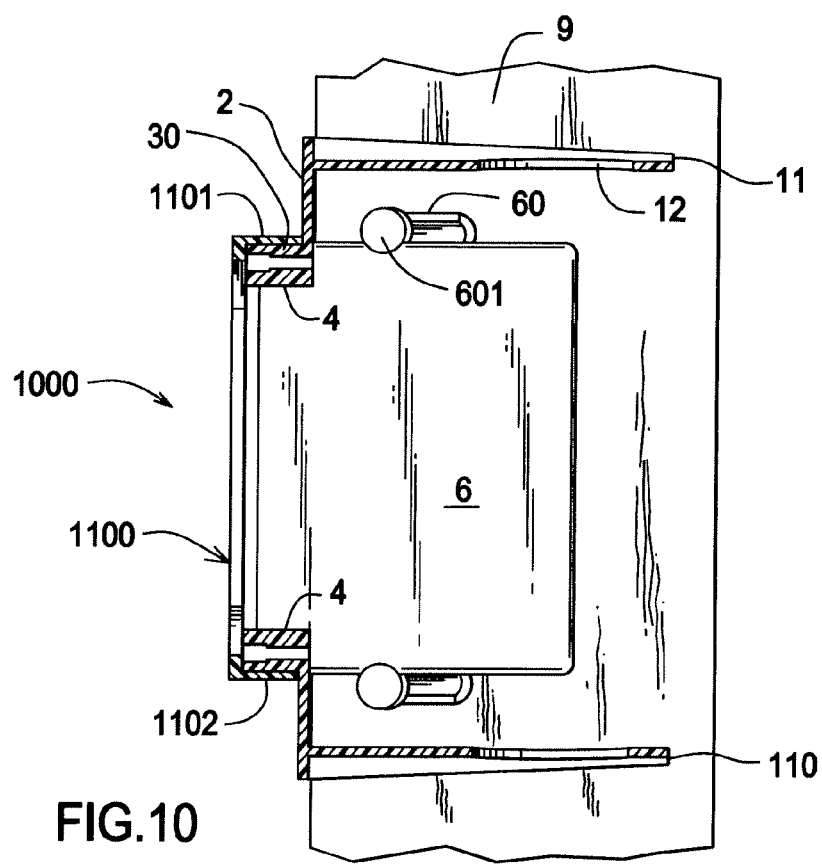
FIG. 10 is a right side plan view of the FIG. 9 embodiment.
Figure 11:
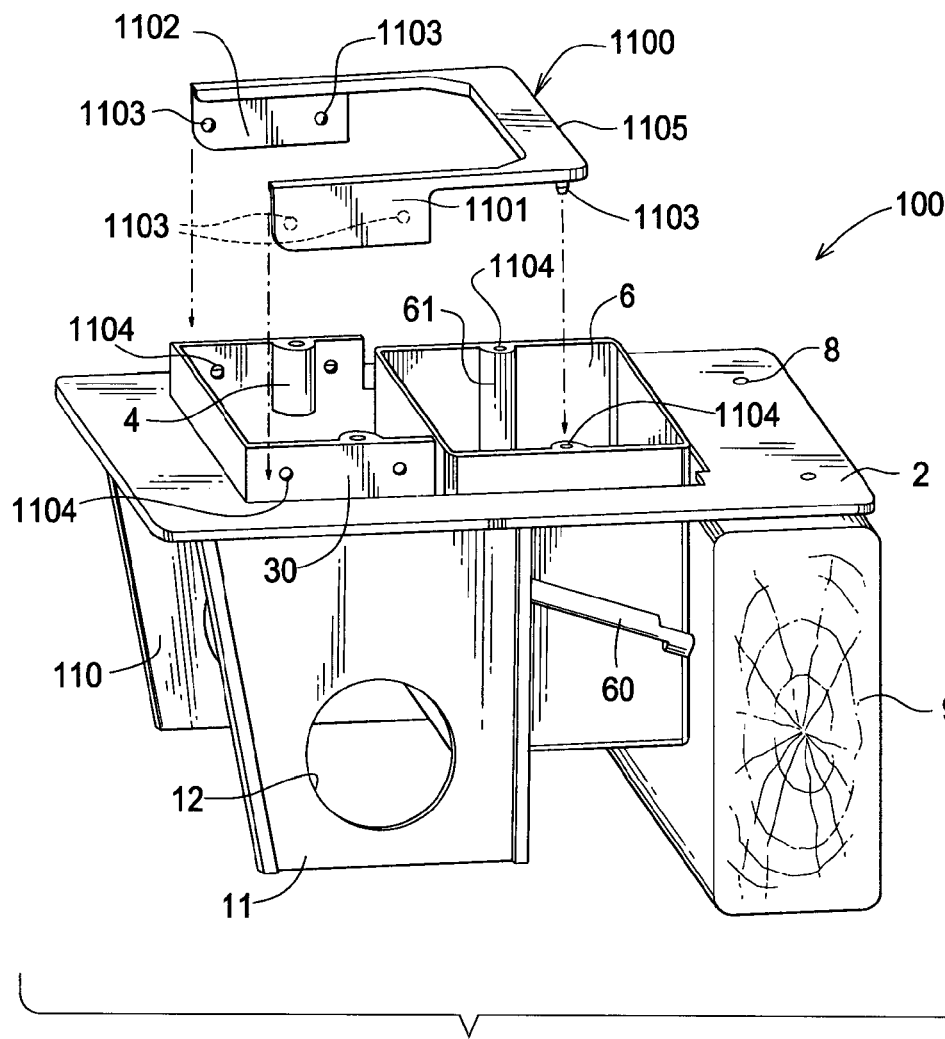
FIG. 11 is a exploded view of the FIG. 9 embodiment.

Referring next to FIGS. 9, 10, 11 a mounting bracket 1000 uses a disposable alignment tool 1100. The tool 1100 has an alignment bar 1105 and support arms 1101, 1102. The nubs 1103 snap into holes 1104. Flange 30 is supported by border 2.

Figure 12:
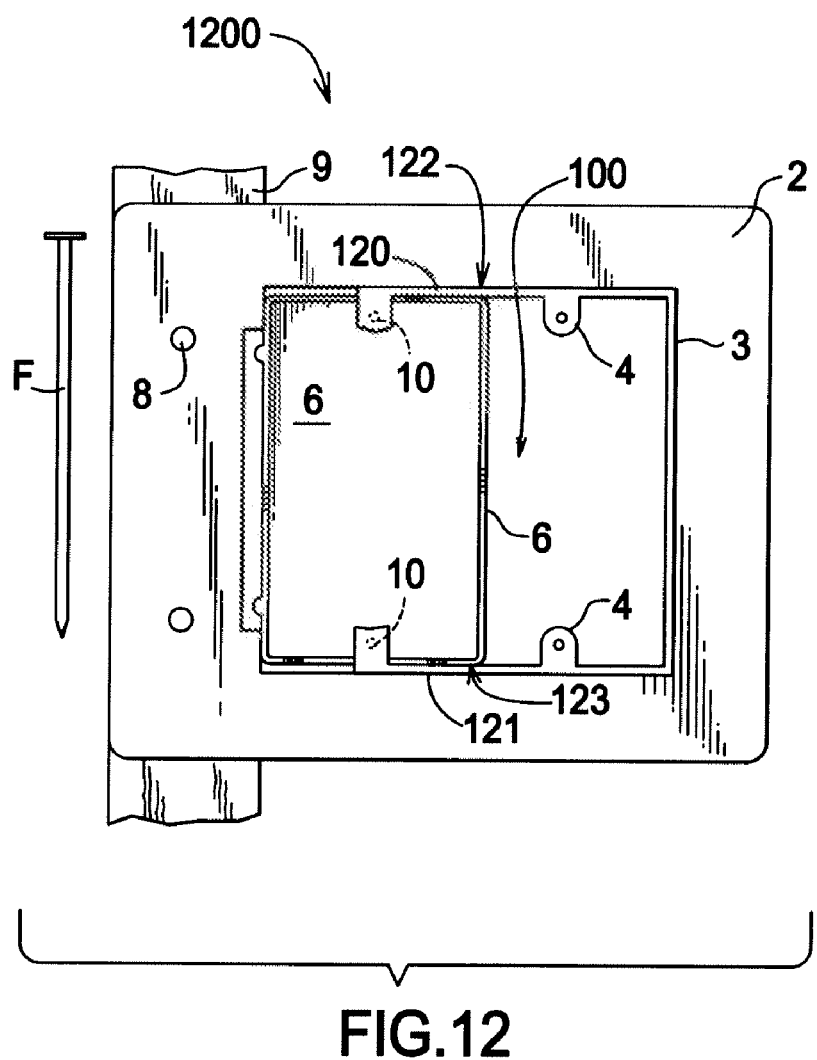
FIG. 12 is a front plan view of an alternate embodiment with breakaway arms in place of a breakaway bar.

Referring next to FIG. 12 another alternate embodiment bracket 1200 is shown. It is identical to bracket 1 of FIG. 1 except the alignment bar 5 is removed. Thus, alignment pins 10 are supported by an upper breakaway arm 120 which snaps off at point 122, and lower breakaway arm 121 which snaps off at point 123.

While a number of exemplifying features and embodiments have been discussed above, those of skill in the art will recognize certain modifications, permutations, additions, and sub-combinations thereof. No limitation with respect to the specific embodiments disclosed herein is intended or should be inferred.

We claim:

1. A bracket for wall mounting at least one low voltage tap point device adjacent to at least one standard electrical receptacle, said bracket comprising:

a rigid border surrounding an opening sized and shaped to accept said at least one low voltage tap point device next to said at least one standard electrical receptacle;

said rigid border having a forward flange around which a wall board can be framed;

said forward flange having a removable alignment tool having alignment nubs projecting from an alignment bar and spaced to be received by a hole in an upper and a lower base of the standard electrical receptacle;

said alignment bar supporting an upper and lower support arm, each support arm having a support arm nub;

wherein each support arm nub is insertable into a respective top and bottom hole in the forward flange; and wherein the bracket is aligned with the standard electrical receptacle by inserting the alignment bar nubs into the receiving holes of the standard electrical receptacle and inserting the support arm nubs into the holes of the forward flange and then fastening the rigid border to the wall to which the standard electrical receptacle is fastened; and wherein the forward flange provides a mounting bracket next to the standard electrical receptacle to receive the low voltage tap point device after the removable alignment tool is removed.

2. The bracket of claim 1 further comprising an upper wiring flange extending rearward from the rigid border.

3. The bracket of claim 2, wherein the upper flange has a hole therethrough.

4. The bracket of claim 1 further comprising a lower wiring flange extending rearward from the rigid border.

5. The bracket of claim 4, wherein the lower wiring flange further comprises a hole therethrough.

6. The bracket of claim 1, wherein the rigid border further comprises an upper and lower mounting base for securing the low voltage tap point device thereto.

* * * * *